(12) United States Patent
Foster et al.

(10) Patent No.: US 6,593,749 B2
(45) Date of Patent: Jul. 15, 2003

(54) WAFER LEVEL METHOD FOR PROBING MICROMECHANICAL DEVICES

(75) Inventors: John Stuart Foster, Santa Barbara, CA (US); Patrick Edward Feierabend, Santa Barbara, CA (US); Michael James Shillinger, Santa Ynez, CA (US)

(73) Assignee: Innovative Micro Technology, Goleta, CA (US)

( * ) Notice: Subject to any disclaimer, the term of this patent is extended or adjusted under 35 U.S.C. 154(b) by 0 days.

(21) Appl. No.: 09/873,076

(22) Filed: May 31, 2001

(65) Prior Publication Data

US 2002/0180452 A1 Dec. 5, 2002

(51) Int. Cl.[7] .............................................. G01R 31/08
(52) U.S. Cl. .................... 324/514; 251/129.01
(58) Field of Search ................... 324/512–514, 324/754–758, 765; 347/54–55, 62–68, 94; 216/27; 251/129.01; 73/37, 861, 862

(56) References Cited

U.S. PATENT DOCUMENTS

| | | | | |
|---|---|---|---|---|
| 5,483,834 A | * | 1/1996 | Frick | 73/724 |
| 5,627,371 A | * | 5/1997 | Griffith et al. | 250/306 |
| 5,971,355 A | * | 10/1999 | Biegelsen et al. | 251/129.06 |
| 6,334,266 B1 | * | 1/2002 | Moritz et al. | 34/337 |

* cited by examiner

*Primary Examiner*—Christine Oda
*Assistant Examiner*—Amy He
(74) *Attorney, Agent, or Firm*—IP Solutions; Jaquelin K. Spong

(57) ABSTRACT

Pressurized fluid from a nozzle is applied against the movable member of a micromechanical device, in order to measure the mechanical properties of the device. The technique is non-destructive, non-invasive, can be applied at the wafer, row or die level, and at early or intermediate stages of fabrication.

16 Claims, 6 Drawing Sheets

WAFER LEVEL METHOD FOR PROBING MICROMECHANICAL DEVICES

FIELD OF THE INVENTION

This invention relates to wafer and die level diagnostic tools to probe micro electromechanical (MEMS) devices during manufacturing processing.

BACKGROUND OF THE INVENTION

In manufacturing of mechanical assemblies it is advantageous to measure characteristics of a part during intermediate stages of processing. Particularly in the case of micro electromechanical (MEMS) devices, which are batch fabricated using semiconductor processing techniques, it is desirable evaluate the performance of devices early to avoid the expense of further processing a defective wafer. However, since the full functioning of the part often cannot be exercised before the latter stages of fabrication, techniques are needed which can evaluate partial functioning or indirectly assess product quality earlier in the process, and at the wafer level. Such diagnostics are a valuable part of process engineering to enhance yields and reduce scrap, cost and cycle time.

Many such diagnostic tools exist for semiconductor processes, however because of the relative novelty and variety of MEMS materials and devices, few tools have been developed which can evaluate the devices in situ. If the MEMS device is an electrostatic actuator for example, the device must be free to move, and vias need to be provided to electrical contacts in order to induce motion. Often, however, the circuit is not sufficiently complete until the latter steps of fabrication. A shaker table may be used to impart relative motion to the device in the absence of a driving circuit, however MEMS are generally low inertia devices, with high surface area-to-mass ratios and high stiffness. Therefore in order to effect large deflections in the devices, high amplitude vibration may be required which can be damaging to the product.

Therefore, there exists an ongoing need in the MEMS art, for simple, non-destructive diagnostic tools for wafer level probing of micromechanical devices.

BRIEF DESCRIPTION OF THE DRAWINGS

The present invention will be understood more fully from the following detailed description, and from the accompanying drawings, which however, should not be taken to limit the invention to the specific embodiments shown but are for explanation and understanding only.

DETAILED DESCRIPTION

The current invention is a method for using a pressurized fluid guided through a nozzle and directed at the movable member of a micromechanical device, and evaluating the reaction of the member to the force of the fluid. The method can be applied to a wide range of MEMS devices, but for illustrative purposes, a micromachined valve will be the subject of the following description.

Figure 1:
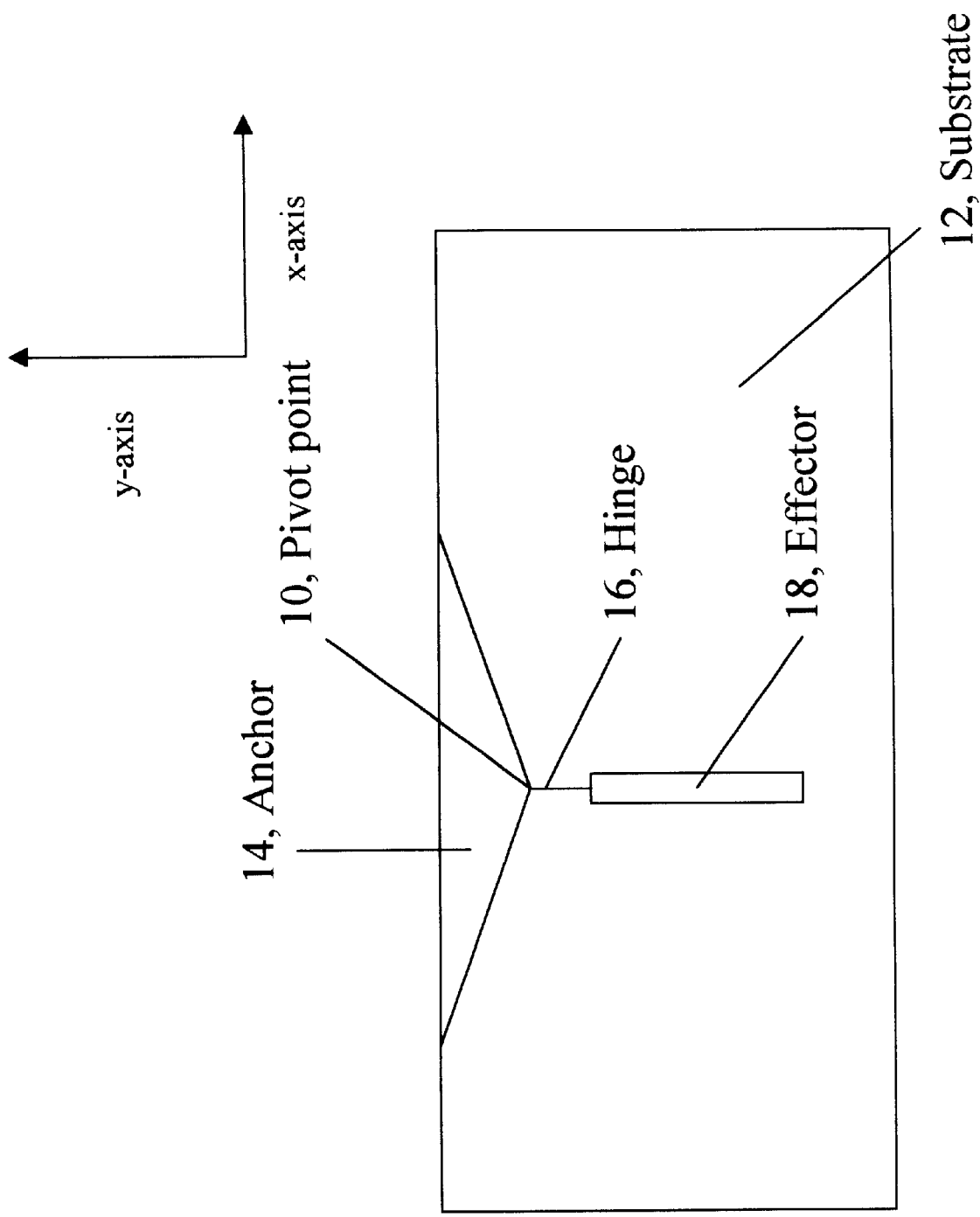
FIG. 1 is a simplified top-down view of an exemplary MEMS device, a valve.

FIG. 1 is a simplified top-down view of the microvalve, which is fabricated on a substrate 12. Silicon is a suitable substrate material for this application. The device comprises a freely moving beam 18, henceforth referred to as the "effector" 18, which opens and closes an aperture (not shown) by pivoting about the point labeled 10 in the figure. That is, a pipe for conducting a fluid would lie along the x-axis, with an aperture perpendicular to the xy-plane shown in the figure. The member 18 operating under a force directed substantially along the x-axis, will pivot about point 10, opening and closing the aperture.

The pivoting motion is accommodated by a flexible hinge structure 16, which is an isthmus of material created by reactive ion etching of the substrate material through a mask designed accordingly. The mask also has feature for the creation of anchor 14, which is the attachment body for the flexible hinge 16.

Figure 2:
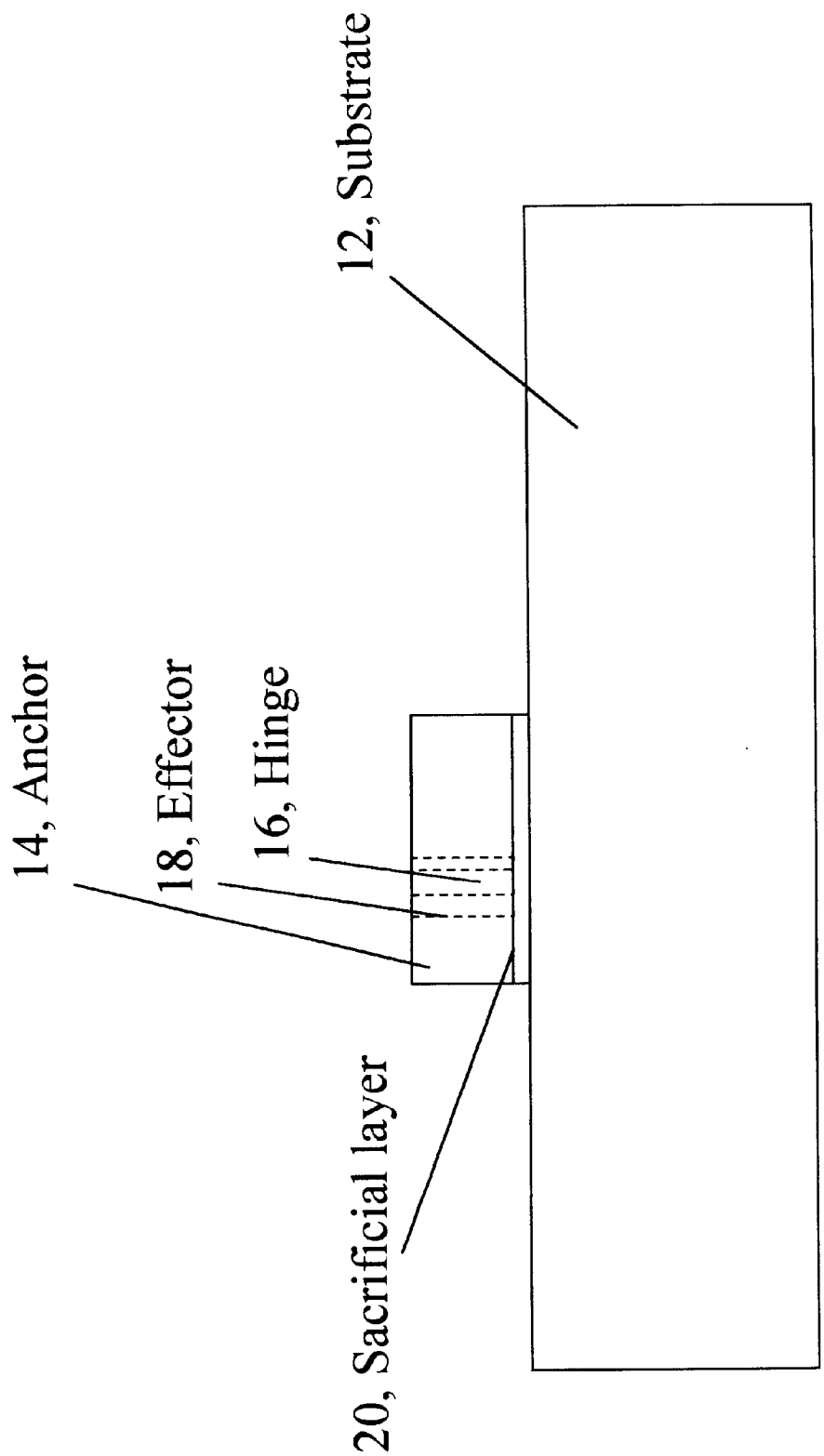
FIG. 2 is a simplified side view of the MEMS valve in the closed position.

In order for effector 18 and hinge 16 to pivot relative to the substrate, the features must be aloft of the substrate. This is accomplished by the deposition of a sacrificial layer prior to the patterning of the device features, and the removal thereof following the creation of the features. The sacrificial layer is shown clearly in FIG. 2, which is a side view of the device showing hinge 16, effector 18, anchor 14, substrate 12, and the sacrificial layer 20.

Figure 3:
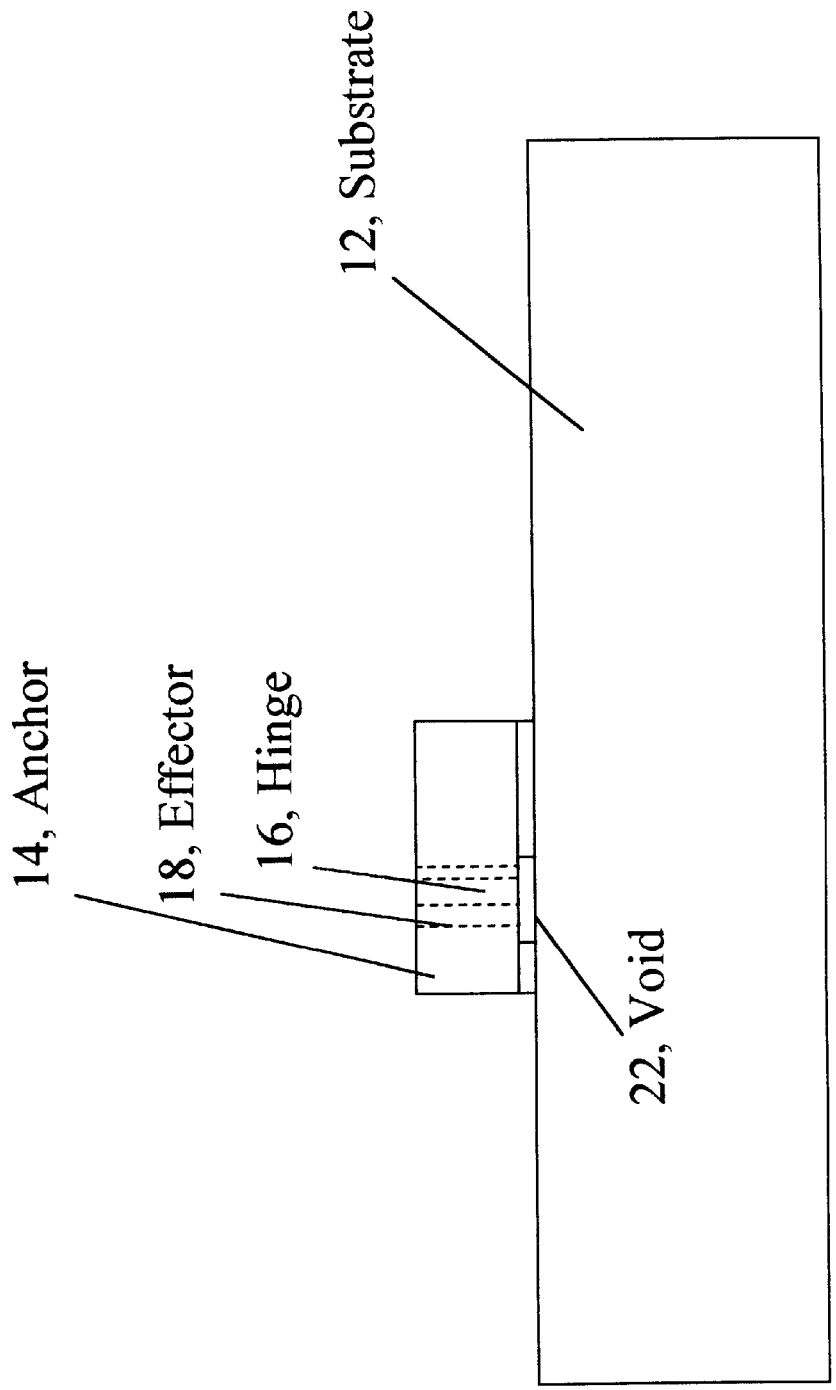
FIG. 3 is simplified side view of the MEMS valve showing the void created after the device has been partially released.

A convenient material for the sacrificial layer is silicon dioxide, whose differential etching properties relative to crystalline silicon are well known from semiconductor processing. An aqueous solution of hydrogen fluoride is an effective selective etchant, removing $SiO_2$ at a much faster rate than Si. The etch rate is chosen such that the $SiO_2$ beneath the hinge and effector is completely removed, but remains underneath the anchor 14, firmly attaching it to the substrate 12. The situation is shown in FIG. 3, where the void 22 results from the removal of material beneath the hinge and effector.

Therefore the simplified process flow to create this device may comprise the following steps:

1. Deposition of sacrificial $SiO_2$ over Si substrate
2. Si deposition
3. Photoresist deposition and patterning
4. Reactive ion etching
5. Release of hinge and effector by removal of remaining $SiO_2$ sacrificial layer with aqueous HF These processes are well known in the MEMS art, and those skilled in the art will appreciate that choices exist for materials and processes to create this and similar devices. For example, one may choose to use focused ion beam (FIB), laser machining, ion beam deposition, chemical vapor deposition, ion milling, vacuum casting, electroplating, etc., for the deposition and removal of material.

A central question during fabrication of such devices is whether or not the release of the movable portions of the device has been achieved. Equally important is whether the sacrificial layer has been over-etched, compromising the stability of the anchor. It is advantageous therefore to evaluate the mechanical characteristics of the hinge and effector at the wafer level, soon after the release step, in order to detect process deviations.

Figure 4:
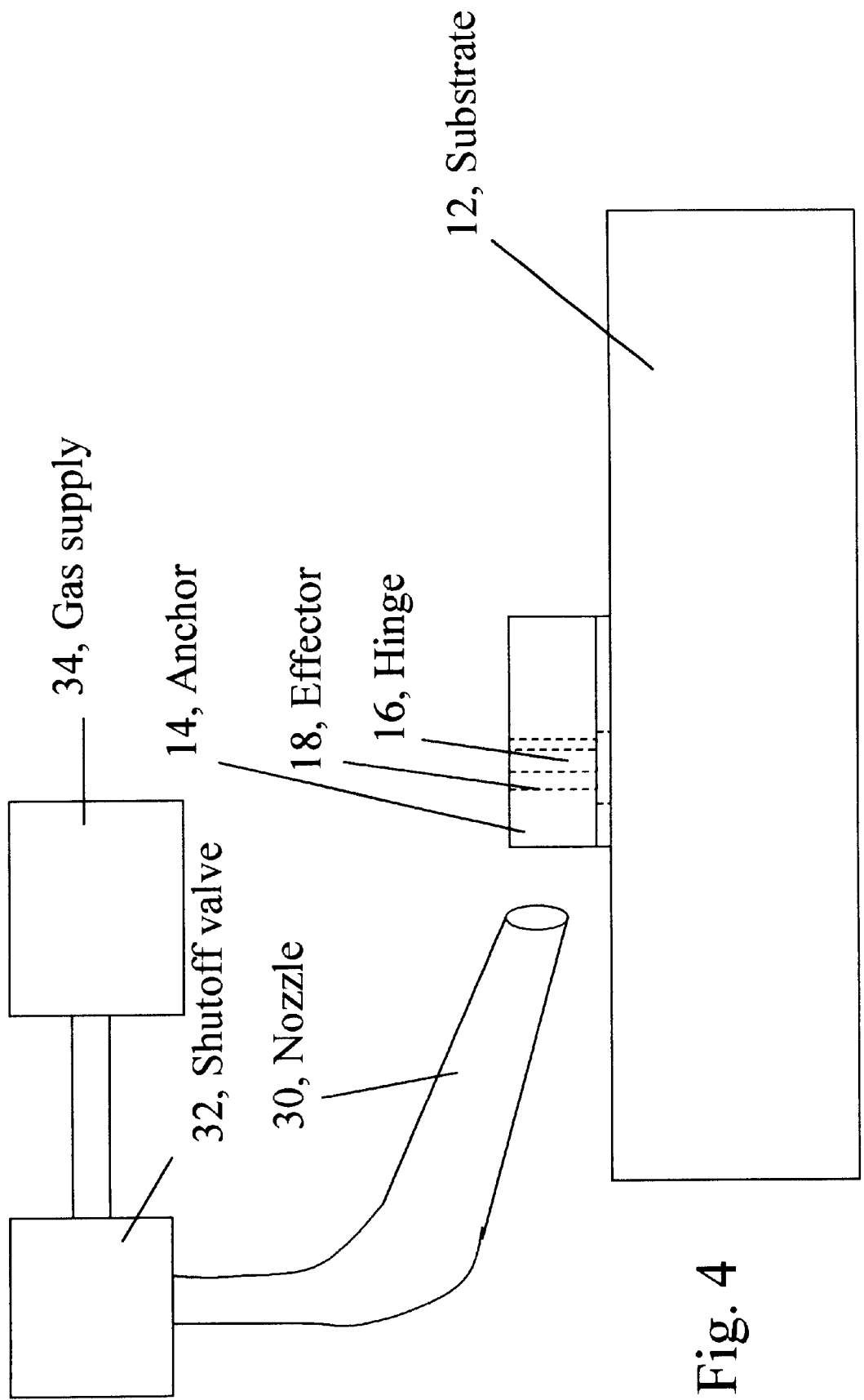
FIG. 4 is a simplified diagram showing the nozzle directed at the MEMS device.

A relatively uniform, non-contacting force can be applied to the movable portion of the MEMS device by directing a fluid flow against it; mechanical characteristics can be inferred by measuring the reaction of the movable portion to the applied force. A flexible pipe with a nozzle, clamped to an articulated mount provides a precise but adjustable delivery system for directing a fluid against the effector 18. For this embodiment, 0.25" flexible tubing is used to deliver compressed $N_2$ to a glass pipette with a 0.035" outer diameter (OD) and 0.010" inner diameter (ID). The situation is depicted in FIG. 4, which shows nozzle 30 connected to a high pressure gas supply 34 through shutoff valve 32. Flow rate is controlled by two regulators in series (not shown) to reduce to 30 psi supply pressure to approximately 0.2 psi (over atmosphere) at the aperture of the pipette.

Figure 5:
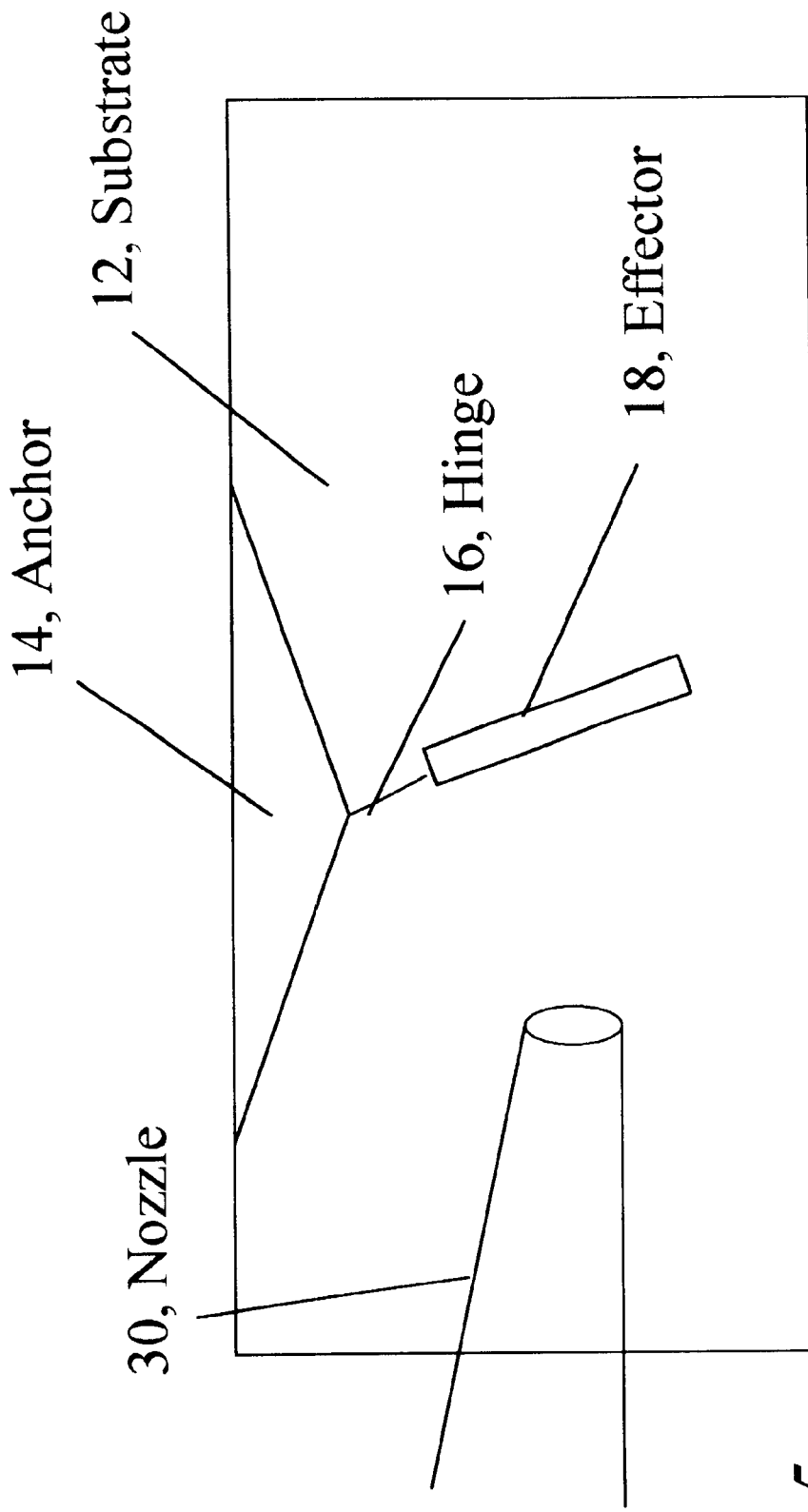
FIG. 5 is a simplified top-down view of the MEMS valve in the open position.

Opening of valve 32 begins the flow of gas against the device. Pressure against the effector causes a deflection, as illustrated in FIG. 5, which is a top down view of the apparatus. Nozzle 30 directs a flow of gas against effector 18, causing hinge 16 to bend about anchor point 10 of anchor body 14. The observation of motion can be made using any of a number of detection means, including laser interferometry, microscopy, light scattering, voltage/capacitance/inductance measurements, etc.

Figure 6:
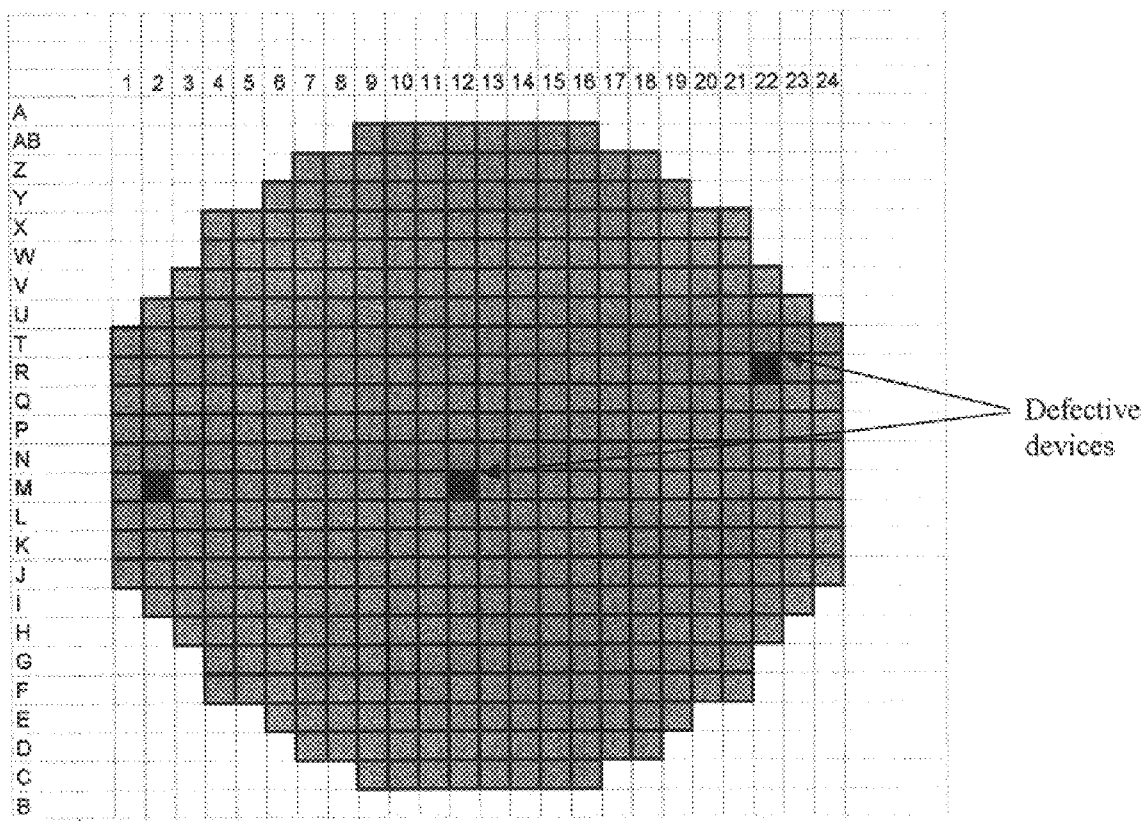
FIG. 6 is a map of the MEMS wafer, showing the devices which have been properly released.

A map of the wafer may be obtained thereby, indicating which devices have been properly released and which have not, by stepping the nozzle across the wafer with and articulated mount, or by moving the wafer beneath the nozzle in the xy-plane (refer to FIG. 1). A map rendered by this process is shown in FIG. 6, where the black cells indicate an improperly functioning device, and the gray cells indicate a properly functioning device. Another embodiment for yielding such data, is by applying a large volume uniform flow across the entire wafer, rather than stepping between devices with a small aperture, directed flow as with the nozzle.

In one embodiment, an optical microscope is used to measure the deflection as a function of force. From this data, the spring constant of the hinge 16 can be derived and compared against expected values. A low spring constant measurement may be indicative of over-etching; a high spring constant measurement may be indicative of under-etching. The etch time of the process is then adjusted until the correct spring constant is measured among the devices on the wafer. In another embodiment, the flow is applied against the device and then paused, allowing the movable portion of the MEMS to vibrate. Measurement of an oscillation frequency can be a convenient way of deriving the spring constant.

The action of the fluid flowing by the device also delivers acts to remove debris from the device and its surrounding area, which may be of significant benefit in some situations.

It will be clear to one skilled in the art, that early measurement of mechanical properties may allow process parameters to be adjusted far earlier than would otherwise be the case. A corollary advantage is that a population of devices can be measured on a single wafer, to judge the uniformity of the fabrication processes across the wafer. The method is easily automated, is capable of high throughput, and may be incorporated into a feedback loop for real time process control. In addition to process improvement, evaluation of parts may allow sorting of devices according to mechanical characteristics. The technique may be applied to devices at the wafer level, row level or individual device level.

While the invention has been particularly described and illustrated with reference to a preferred embodiment, it will be understood by those skilled in the art that changes in the description and illustrations may be made with respect to form and detail without departing from the spirit and scope of the invention. Various detection mechanisms exist which would accomplish the similar objectives using the method described herein. Alternative gases may be chosen depending on the materials being probed and the degree of inertness required. The method can be directed to a wide variety of devices having moving parts, such as actuators, motors, switches, pistons, etc. Similarly, the method can be adjusted to accommodate various mechanical designs and features, such as stiffness, mass, form factor and geometry of the devices. Accordingly, the present invention is to be considered as encompassing all modifications and variations coming within the scope defined by the following claims.

What is claimed is:

1. A method for probing a MEMS device, comprising
   a. directing a fluid flow against a movable portion of the MEMS device wherein the fluid flow exits from a nozzle;
   b. detecting movement of the movable portion of the MEMS device with a detection means;
   c. measuring the amount of movement of the movable portion of the MEMS device;
   d. aligning a direction of flow from the nozzle; and
   e. measuring the change in the amount of movement of the movable portion of the MEMS device.

2. The method of claim 1, wherein the nozzle is affixed to an articulated mount.

3. The method of claim 1, further comprising adjusting a rate of flow from the nozzle.

4. The method of claim 1 wherein the fluid is air, helium, nitrogen, or argon.

5. The method of claim 1 wherein the fluid is water.

6. The method of claim 1, wherein the fluid is oil.

7. The method of claim 1, wherein the detection means is a laser interferometer, a microscope, a photodetector, or a visual recognition system.

8. The method of claim 1, wherein the detection means is a capacitance measurement, a voltage measurement, or an inductance measurement.

9. The method of claim 1, wherein the MEMS device is an actuator, a motor, a switch, a valve, or a piston.

10. The method of claim 1, wherein the MEMS device is at the wafer level.

11. The method of claim 1, wherein the MEMS device is at the row level.

12. The method of claim 1, wherein the MEMS device is at the die level.

13. The method of claim 1, wherein the MEMS device is affixed to an articulated mount.

14. A method for probing a MEMS device, comprising:
 a. directing a fluid flow against a movable portion of the MEMS device wherein the fluid flow exits from a nozzle;
 b. detecting movement of the movable portion of the MEMS device with a detection means;
 c. measuring the amount of movement of the movable portion of the MEMS device;
 d. adjusting the rate of flow from the nozzle; and
 e. measuring the change in the amount of movement of the movable portion of the MEMS device.

15. The method of claim 14, further comprising adjusting an aperture of the nozzle.

16. A method for probing a MEMS device, comprising:
 a. directing a fluid flow against a movable portion of the MEMS device wherein the fluid flow exits from a nozzle;
 b. detecting movement of the movable portion of the MEMS device with a detection means;
 c. pausing the flow from the nozzle; and
 d. measuring the vibration of the movable portion of the MEMS device.

* * * * *